United States Patent
Hosoya et al.

(10) Patent No.: US 7,094,155 B2
(45) Date of Patent: Aug. 22, 2006

(54) CONSTANT VELOCITY UNIVERSAL JOINT

(75) Inventors: Takashi Hosoya, Iwata (JP); Keizo Nagasawa, Iwata (JP); Katsuyuki Ikei, Iwata (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 09/995,678

(22) Filed: Nov. 29, 2001

(65) Prior Publication Data

US 2002/0077186 A1 Jun. 20, 2002

(30) Foreign Application Priority Data

Dec. 20, 2000 (JP) ............... 2000-386880

(51) Int. Cl.
*F16D 3/224* (2006.01)

(52) U.S. Cl. ........... 464/145; 464/906

(58) Field of Classification Search .......... 464/15, 464/145, 906, 139, 143
See application file for complete search history.

(56) References Cited

U.S. PATENT DOCUMENTS

| | | | | |
|---|---|---|---|---|
| 4,305,263 A | * | 12/1981 | Kako et al. | ........... 464/145 |
| 4,529,254 A | * | 7/1985 | Krude | ........... 301/126 |
| 5,230,659 A | * | 7/1993 | Bird et al. | ........... 464/143 |
| 5,411,336 A | * | 5/1995 | Takemura et al. | ........... 384/492 |
| 5,580,313 A | * | 12/1996 | Jacob et al. | ........... 464/145 |
| 5,630,668 A | * | 5/1997 | Ikezawa et al. | ........... 384/527 |
| 5,692,960 A | * | 12/1997 | Sugiyama et al. | ........... 464/145 |
| 6,227,979 B1 | * | 5/2001 | Yamamoto et al. | ........... 464/145 |
| 6,299,542 B1 | * | 10/2001 | Ouchi et al. | ........... 464/145 |
| 6,332,844 B1 | * | 12/2001 | Hayama et al. | ........... 464/145 |
| 6,367,981 B1 | * | 4/2002 | Yamamoto et al. | ........... 384/527 |
| 6,398,886 B1 | * | 6/2002 | Fuhrmann et al. | ........... 148/639 |
| 6,497,622 B1 | | 12/2002 | Bilz et al. | |
| 6,665,936 B1 | | 12/2003 | Kochsiek | |
| 2002/0022528 A1 | | 2/2002 | Nakagawa et al. | |
| 2002/0065138 A1 | | 5/2002 | Johnson et al. | |

FOREIGN PATENT DOCUMENTS

| | | |
|---|---|---|
| AT | 7775800 | 4/2001 |
| DE | 19958719 | 3/2001 |
| EP | 921 329 | 6/1999 |
| FR | 2 801 653 | 6/2001 |
| FR | 2809146 | 11/2001 |

* cited by examiner

*Primary Examiner*—Kenneth Thompson

(57) ABSTRACT

A spherical inner surface of the outer race and track grooves in the outer race are each defined by a post-hardening cut surface. A spherical outer surface of the inner race and track grooves in the inner race are also each defined by a post-hardening cut surface. A retainer has a spherical outer surface, a spherical inner surface and inner surfaces of the pockets, all of which are defined by a post-hardening cut surface. Respective surfaces of the retainer, the outer race and the inner race which contact with each other are formed with a surface treatment layer for reducing a frictional resistance.

5 Claims, 12 Drawing Sheets

CONSTANT VELOCITY UNIVERSAL JOINT

BACKGROUND OF THE INVENTION

1. Field of the Invention

The present invention relates generally to a constant velocity universal joint for automotive vehicles and, more particularly, to the constant velocity universal joint used in an automobile propeller shaft.

2. Description of the Prior Art

The constant velocity universal joint for automotive vehicles, particularly the constant velocity universal joint used on an automobile propeller shaft when in use rotates at a high speed and does therefore require a capability of rotating in a balanced state and, also, a capability of suppressing internal heat generation. To attain a good rotatory balance, a gap present inside the universal joint has to be minimized in size. However, the smaller the gap, the more considerable generation of heat, and therefore in order to suppress the heat generation, the frictional resistance occurring between mating component parts must be reduced by minimizing surface roughness of those component parts. For this reason, in the constant velocity universal joint of a fixed ball type, contact surfaces of an inner race, an outer race and a cage all forming parts of the universal joint are, after those component parts have been heat treated, machined to secure a required dimensional accuracy and a required surface roughness. Also, as a means for reducing the frictional resistance inside the constant velocity universal joint, formation of a coating of a solid lubricating agent on those component parts is known in the art such as disclosed in, for example, the Japanese Laid-open Utility Model Publication No. 2-121333.

The grinding process generally requires a relatively long machining time as compared with the cutting process. Also, the grinding process requires the use of a coolant of a kind which is offensive to the environment.

SUMMARY OF THE INVENTION

Accordingly, the present invention has for its object to provide an improved constant velocity universal joint wherein an spherical inner surface of an outer race and track grooves can be machined to exhibit a precision while the required machining time is reduced.

Another important object of the present invention is to enable a precision to be secured in the spherical inner surface of the inner race and the track grooves while the required machining time is reduced.

A further important object of the present invention is to minimize generation of heat resulting from contact of component parts, particularly minimization of the heat during an initial stage of use.

In order to accomplish these objects, the present invention provides a constant velocity universal joint, which includes an outer race having a spherical inner surface; an inner race having a spherical outer surface and positioned inside the outer race, said spherical outer surface having a plurality of track grooves defined therein in correspondence with the respective track grooves in the outer race; a plurality of balls interposed between the outer and inner races and rotatably accommodated between the mating track grooves in the outer and inner races; and a retainer having a plurality of pockets accommodating therein the corresponding balls. The spherical inner surface has a plurality of track grooves defined therein. Each of said track groove in the outer race has a groove bottom of a longitudinal sectional shape representing a shape of a curve. Also, each of the track groove in the inner race has a groove bottom of a longitudinal sectional shape representing a shape of a curve. The retainer has a spherical outer surface, held in surface contact with the spherical inner surface of the outer race, and a spherical inner surface held in surface contact with the spherical outer surface of the inner race. Each of the track grooves in the outer race has a center of curvature lying in an axial section of the outer race and, also, each of the track grooves in the inner race has a center of curvature lying on an axial section of the inner race. The center of curvature of each track groove in the outer race and the center of curvature of each track groove in the inner race are offset an equal distance leftwardly and rightwardly with respect to an angle center of the universal joint. The spherical inner surface of the outer race or each of the track grooves in the outer race, or both of the spherical inner surface of the outer race and each of the track grooves in the outer race, is or are defined by a post-hardening cut surface.

According to the present invention, since one or both the spherical inner surface of the outer race and each of the track grooves in the outer race have been cut after a hardening process that is employed in place of the conventional grinding process taking place subsequent to the heat treatment, the processing time can be reduced. Because of the use of the cutting process, it is possible to process without any coolant offensive to the environment. As a result of recent improvement in the processing technology, the cutting process itself has now become a highly precise process and, therefore, even a hard metal such as hardened steel can be cut satisfactorily. Also, since the cutting process is used after the hardening treatment and no strain which would otherwise result from the heat treatment is induced subsequently, the precision of the spherical inner surface and the track grooves in the completed outer race can be secured. By way of example, it is possible to secure the dimensional accuracy comparable to that afforded by, for example, the grinding process.

The cutting process has hitherto been carried out, in general, prior to the hardening treatment and, specifically, the outer race used in the conventional constant velocity universal joint. It is, however, pointed out that even though a high precision cutting process is carried out during a cutting stage prior to the hardening treatment, the precision tends to decrease as a result of the strain induced during the subsequent heat treatment. Although it can be contemplated to effect the cutting process to a shape in anticipation of change in shape which takes place after the hardening treatment, shape management is difficult to achieve. Accordingly, in the present invention, the cutting process after the hardening treatment is employed to simultaneously achieve securement of the precision and reduction of the processing time. Thus, it will readily be seen that the cost can be reduced advantageously while securing the performance.

Preferably, the spherical outer surface of the inner race or each of the track grooves in the inner race, or both of the spherical outer surface of the inner race and each of the track grooves in the inner race, is or are defined by a post-hardening cut surface.

If even the inner race is subjected to the cutting process in a manner similar to the outer race, in place of the use of the conventional grinding process after the hardening treatment, it is possible to secure a prevision of the spherical outer surface of the inner race or each of the track grooves in the inner race, or both of the spherical outer surface of the inner race and each of the track grooves in the inner race, while the processing time is reduced. Thus, the use of the cutting surface after the hardening treatment in both of the outer and inner races results in increase of productivity.

In the practice of the present invention, of the spherical outer surface, the spherical inner surface and the pockets, at least the pockets have respective inner surfaces which are preferably defined by a post-hardening cut surface.

The inner surfaces defining each pocket in the retainer is advantageous in that, for example, after the carburizing process, a dimensional precision comparable to that obtained by grinding can be obtained and, therefore, pockets gaps can be set within a predetermined range. While the pockets are defined by blanking a plate by means of a press work and are subsequently milled to a required dimension, the subsequent heat treatment of the retainer tends to result in change in shape and, therefore, the pocket gaps are difficult to be set within the predetermined range that is required by a matching or the like. The requirement as to the dimensional precision can be satisfied if the post-hardening cut surface is employed.

In another preferred embodiment of the present invention, the constant velocity universal joint is for use with a propeller shaft. As is well known to those skilled in the art, the constant velocity universal joint used with the propeller shaft rotates at a high speed and, therefore, gaps within the universal joints have to be as small as possible to thereby secure a satisfactory rotational balance, and also the surface roughness has to be as small as possible in order for heat generating in the universal joint during operation thereof to be suppressed. The use of the post-hardening cut surface in various parts is effective to satisfy the requirements in terms of the precision and the surface roughness of the associated parts.

Where the constant velocity universal joint of the present invention is used with the propeller shaft, the constant velocity universal joint is preferably of a structure in which the outer race has an inlet mouth and a rear opening opposite to the inlet mouth and having a diameter smaller than a diameter of the mouth, and the outer race is formed with a fitting flange at a location radially outwardly of an outer periphery of the inlet mouth and also with a cylindrical mount so as to protrude axially outwardly from the rear opening, so that the propeller shaft can extend through the opening and is then engaged with the inner peripheral surface of the inner race.

The number of the track grooves in each of the inner and outer races is preferably eight.

As compared with the constant velocity universal joint wherein the six track grooves are employed in each of the inner and outer races, the use of the eight track grooves in each of the inner and outer races makes it possible to employ an increased number of the balls of a relatively small diameter thereby rendering the universal joint compact in radial dimension. For this reason, although the requirement in terms of prevision in a groove shape is severe, the use of the post-hardening cut surface in accordance with the present invention has made it possible to satisfy such severe requirement. Also, although increase of the number of the track grooves may result in a relatively large processing time, an effect of reducing the processing time is considerable since the cutting of the hardened steel provides a high workability as compared with the grinding. By way of example, where the number of the track grooves is eight such as in the preferred embodiment, a single cutting tool is sufficient for cutting of the hardened steel in contrast to the two grinding tools required in the practice of grinding to secure the productivity.

In a further preferred embodiment, a surface of at least the retainer is formed with a surface treatment layer for reducing a frictional resistance. Although portion where the surface treatment layer is formed may be only the spherical outer surface and the spherical inner surface of the retainer, it is, however, preferred to form the surface treatment layer not only on the spherical outer surface and the spherical inner surface of the retainer, but also on the inner surfaces of the pockets in the retainer.

Where the post-hardening cut surface is employed such as in the present invention, the requirement associated with the surface roughness can generally be satisfied, but it may occur that lead markings may be left on the processed surfaces. However, the use of the surface treatment layer provides a rather smooth surface with no lead marking left thereon. Accordingly, when the surfaces of the retainer is provided with the surface treatment layer to provide the smooth surfaces, the resistance to friction among the component parts can be reduced to thereby minimize heat generation during the high speed rotation. Also, the use of the surface treatment layer on the side of the retainer, only if such surface treatment layer is provided in the retainer which is one of the component parts of the constant velocity universal joint, is effective to reduce the resistance to friction occurring in the inner and outer races.

The surface treatment layer referred to above may be a film of a solid lubricant. The use of the film of the solid lubricant is effective to lubricate respective contact surfaces of the component parts, contributing considerably to reduction in frictional resistance. In particular, reduction of the frictional resistance thus obtained is advantageous in enhancing an effect of suppressing heat generation during the high speed rotation at an initial stage of use.

As compared with the constant velocity universal joint for use with a drive shaft, the constant velocity universal joint for use with the propeller shaft has a relatively small operating angle and the amount of motion of the balls moving along the track grooves in a direction axially of the balls is also small. Accordingly, if a grease intervening in sliding portions of the balls is purged, the grease will have difficulty reentering into the sliding portions and, therefore, an excessive increase of the temperature will result in from insufficient lubrication. Considering that at the initial stage of use of the universal joint, the grease has not yet been distributed and, therefore, insufficient lubrication is apt to occur. The use of the solid lubricant film is effective to suppress the excessive heat generation at the initial stage of use of the universal joint before the lubricant is distributed.

Alternatively, the surface treatment layer may be a low temperature sulfurized layer. Since the low temperature sulfurizing process is carried out at low temperature, the work will not be tempered during the process and, therefore, any possible reduction in abrasion resistance resulting from reduction in hardness consequent upon the tempering can be avoided.

In a preferred embodiment of the present invention, each of the track grooves in each of the inner and outer races and the corresponding ball cooperate to define radial gaps therebetween, each of said radial gap being of a size not greater than 0.05 mm. The radial gaps in the radial direction of the universal joint are represented by the distance between the ball and each of opposite inner surfaces of each track groove as measured on the pitch circle depicted by the balls.

Selection of the radial gaps of a size not greater than 0.05 mm is effective to improve the rotational balancing performance. Particularly where the constant velocity universal joint is for use with the propeller shaft, the smaller radial gaps are preferred because of the high speed rotation. Even though the track grooves are represented by the post-hardening cut surface, a processing precision to achieve the radial gaps not greater than 0.05 mm can be obtained.

In the practice of the present invention, each of the pockets in the retainer and the corresponding ball accommodated therein may cooperate to define positive axial gaps. In the constant velocity universal joint for use with the drive shaft, the axial gaps between each of the balls and the corresponding pocket in the retainer is generally chosen to be negative. However, in the case of the constant velocity universal joint for use with the propeller shaft, the positive axial gaps as discussed above are preferred in terms of prevention of the heat generation during the high velocity rotation.

Also, in a preferred embodiment of the present invention, each of the track grooves in the outer race has a transverse sectional shape that is oval. Where the oval shape is chosen, each of the balls contact the associated track grooves at two points. For this reason, variation in the angle θ of contact can be minimized. A process to form the oval transverse sectional shape can easily be performed in the hardened steel cutting.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

Figure 1:
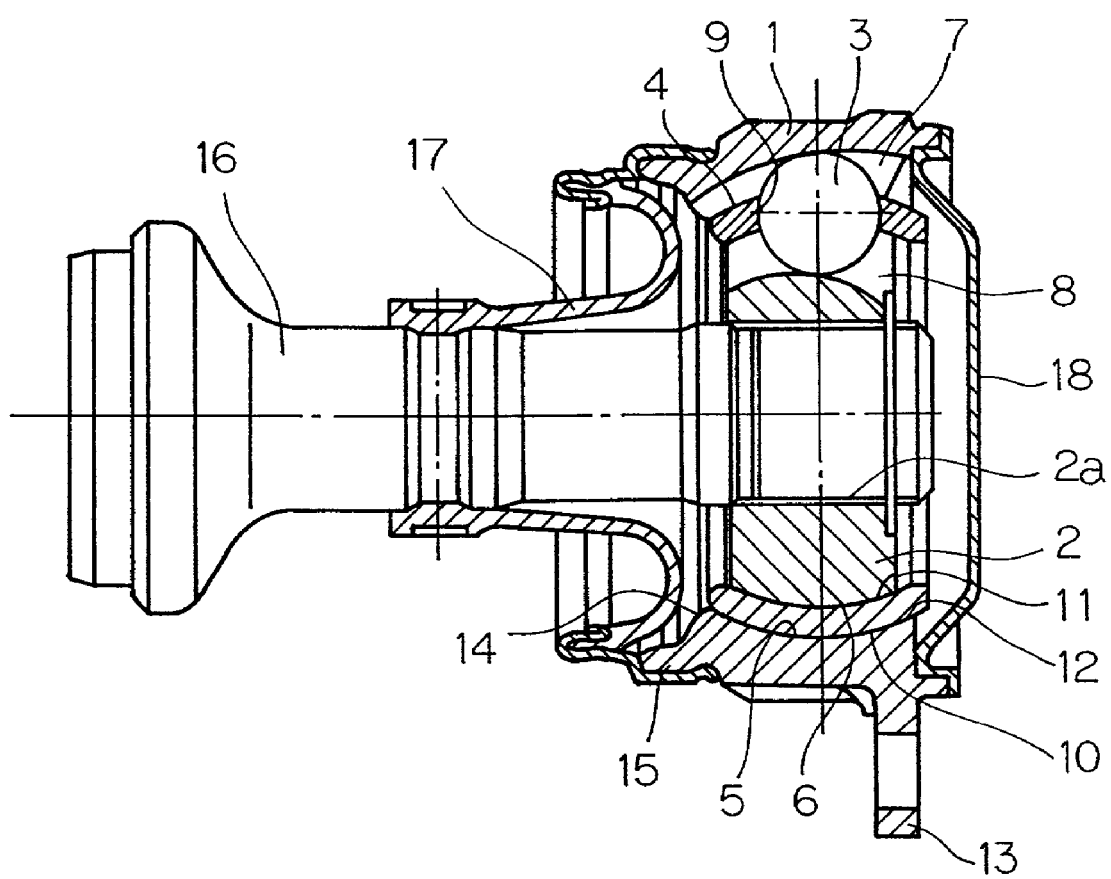
FIG. 1 is a longitudinal sectional view of a constant velocity universal joint according to a preferred embodiment of the present invention, shown as coupled with a propeller shaft.

A preferred embodiment of the present invention will now be described with reference to the accompanying drawings. In describing the preferred embodiment, the present invention will be described as applied to a constant velocity universal joint of a fixed type for use on a propeller shaft. Referring particularly to FIG. 1, the illustrated constant velocity universal joint includes an outer race 1 having a spherical inner surface 5 formed with a plurality of axially extending track grooves 7, and an inner race 2 having a spherical outer surface 6 formed with a corresponding number of track grooves 8 cooperable with the track grooves 7 in the outer race 1. Torque transmitting balls 3 operatively retained by a retainer or cage 4 are interposed between the inner and outer races 2 and 1 with each ball 3 movably received in part in the respective groove 7 and in part in the mating groove 8. The retainer 4 has pockets 9 defined therein in a number equal to the number of the balls 3 used and also has a spherical outer surface 10, which is held in face-to-face contact with the spherical inner surface 5 of the outer race 1, and a spherical inner surface 11 held in face-to-face contact with the spherical outer surface 6 of the inner race 2.

Figure 2:
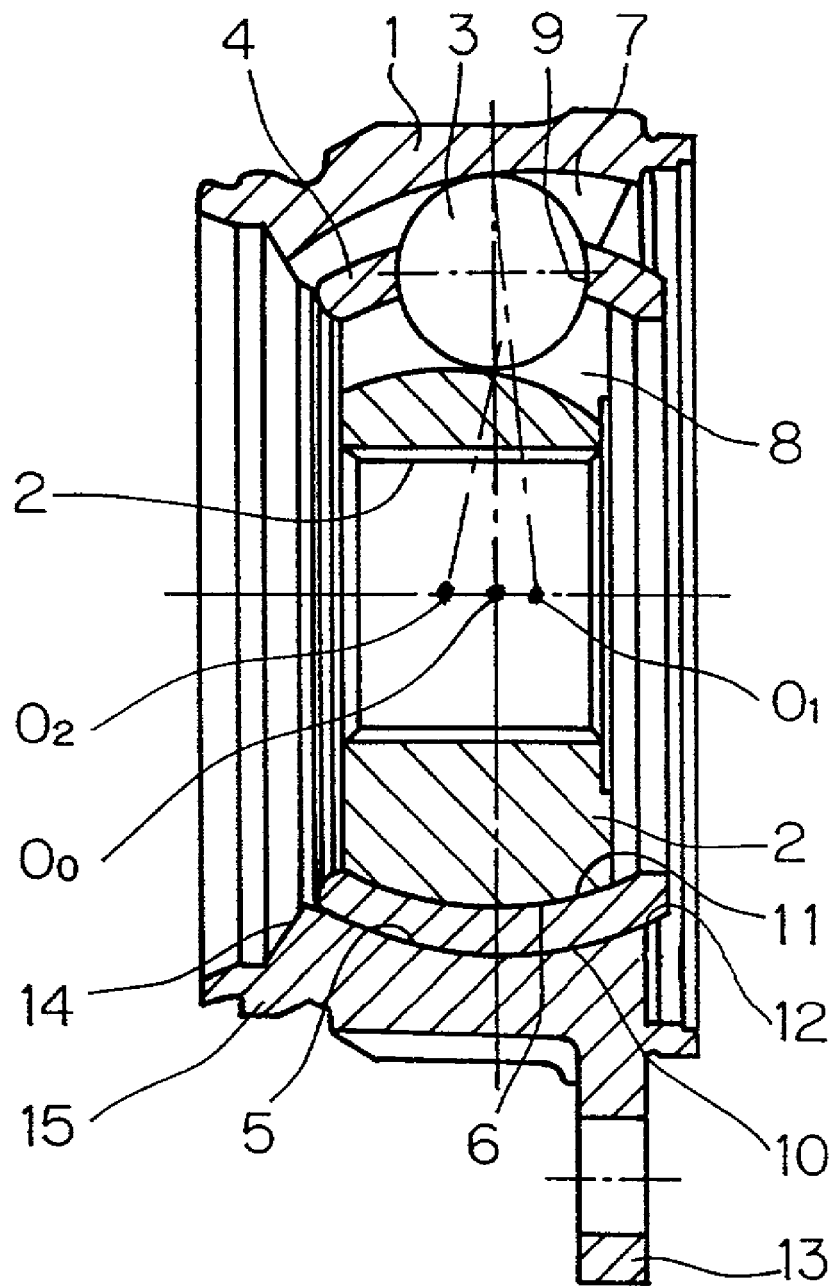
FIG. 2 is a fragmentary longitudinal sectional view, on an enlarged scale, of the constant velocity universal joint shown in FIG. 1.
Figure 3:
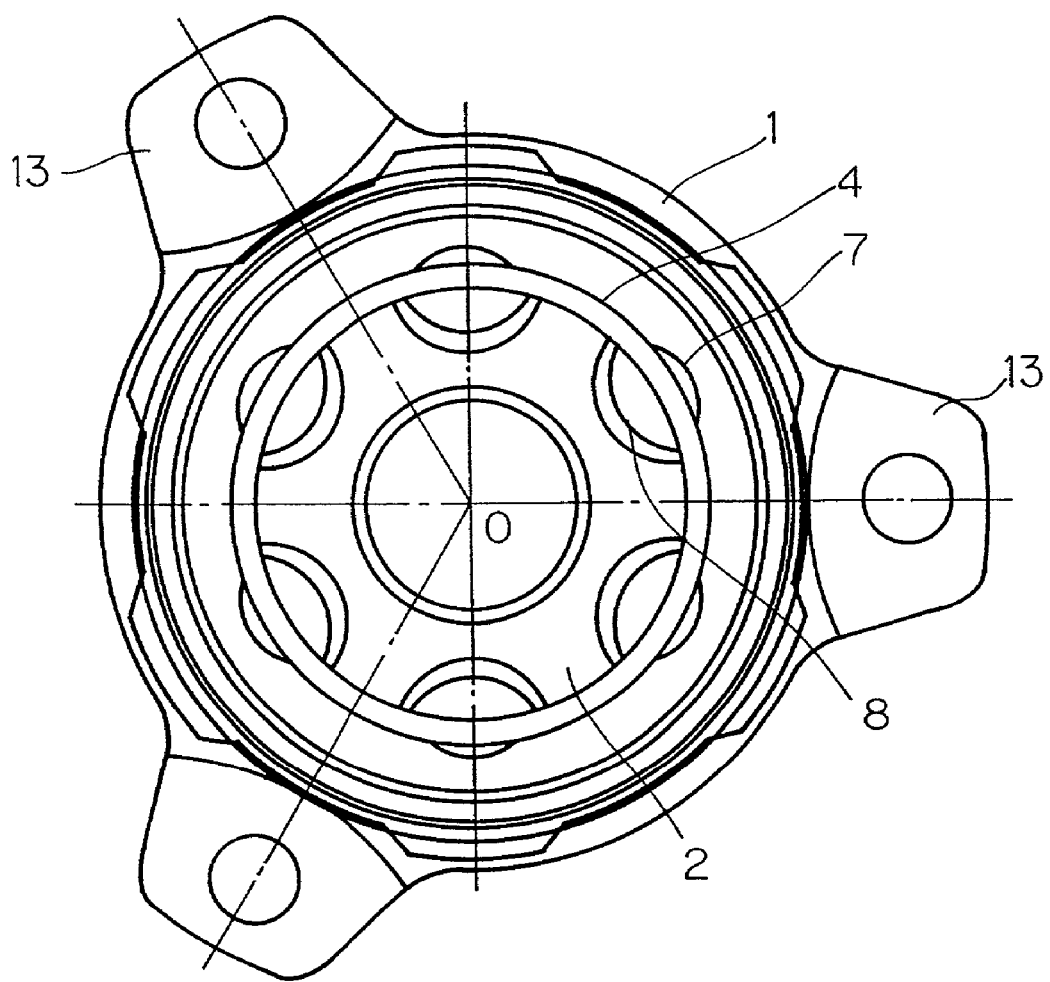
FIG. 3 is a front elevational view of the constant velocity universal joint shown in FIG. 1.

Each of the track grooves 7 defined in the outer race 1 has a groove bottom that depicts an arcuate curve when viewed in a longitudinal section. Similarly, each of the track grooves 8 defined in the inner race 2 has a groove bottom that depicts an arcuate curve when viewed in a longitudinal section. As best shown in FIG. 2, the center of curvature $O_1$ of each track groove 7 of the outer race 1 as viewed in a longitudinal section taken along an axial direction of the constant velocity universal joint and the center of curvature $O_2$ of each track groove 8 of the inner race 2 as viewed in a longitudinal section similarly taken along the axial direction of the constant velocity universal joint are offset an equal distance from the center $O_O$ of the angle of rocking motion of the constant velocity universal joint so as to lie on respective sides of the angular center $O_O$ along the longitudinal axis of the constant velocity universal joint. The angular center $O_O$ of the universal joint coincides with the center of the sphere occupied by the spherical inner surface 5 of the outer race 1 and that occupied by the spherical outer surface 6 of the inner race 2.

Figure 8:
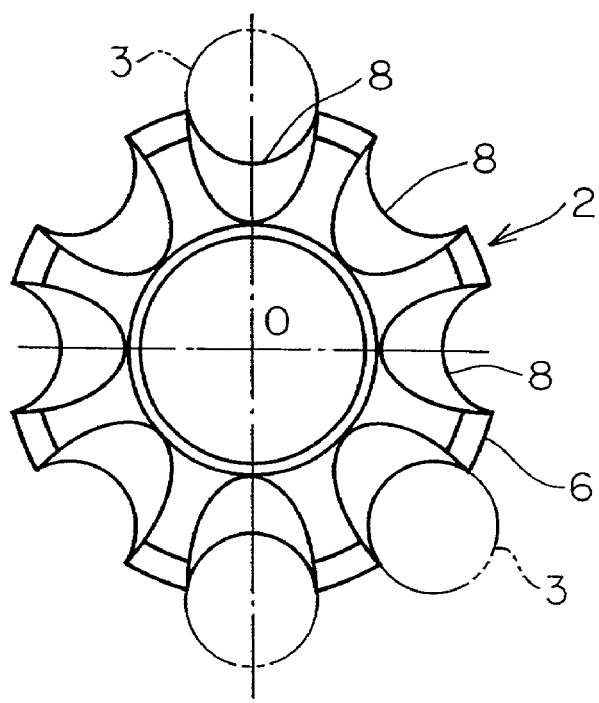
FIG. 8 is a front elevational view, showing a modified form of the inner race shown in FIG. 7.

The number of the track grooves 7 or 8 in each of the outer and inner races 1 and 2 is chosen to be six and these six track grooves 7 or 8 are spaced an equal distance from each other in a direction circumferentially of the inner or outer race 1 or 2. It is, however, to be noted that the number of the track grooves 7 or 8 in each of the outer and inner races 1 and 2 may be eight as shown in a modified form of the inner race 2 in FIG. 8.

As shown in FIG. 1, the outer race 1 has an inlet mouth 12 and a rear opening 14 opposite to the inlet mouth 12 and adjacent the propeller shaft 16, the rear opening 14 having a diameter smaller than that of the inlet mouth 12, or an inner diameter of the outer race 1 at a front end portion. The outer race 1 also includes a fitting flange 13, which is formed therewith so as to protrude radially outwardly therefrom and positioned adjacent the inlet mouth 12, and a cylindrical mount 15 protruding axially outwardly from the rear opening 14. The propeller shaft 16 has a free end inserted through the rear opening 14 into the interior of the inner race 2 so as to be engaged with the inner peripheral surface 2a of the inner race 2. The inner peripheral surface 2a of the inner race 2 and an outer surface of the free end of the propeller shaft 16 are both serrated so that the inner race 2 and the propeller shaft 16 are coupled together for rotation together therewith. A tubular boot 17 having first and second ends opposite to each other is mounted on the propeller shaft 16 with the first end fixed thereto by means of a fastening ring (not shown) while the second end of the tubular boot 17 is positioned outside the cylindrical mount 15 and fixed to the cylindrical mount 15 by means of a fastening ring (also not shown). On the other hand, the inlet mouth 12 of the outer race 1 is closed by a round cover plate 18 having its peripheral edges engaged to the inner peripheral surface of the outer race 1. The constant velocity universal joint of the type shown in the illustrated embodiment wherein the propeller shaft 16 is inserted into the outer race 1 is generally referred to in the art as a Rzeppa type constant velocity universal joint.

The propeller shaft 16 referred to hereinabove may be the one employed to connect an output shaft of an automotive power plant of, for example, a front engine vehicle or a rear drive vehicle with the differential gear.

Figure 10A:
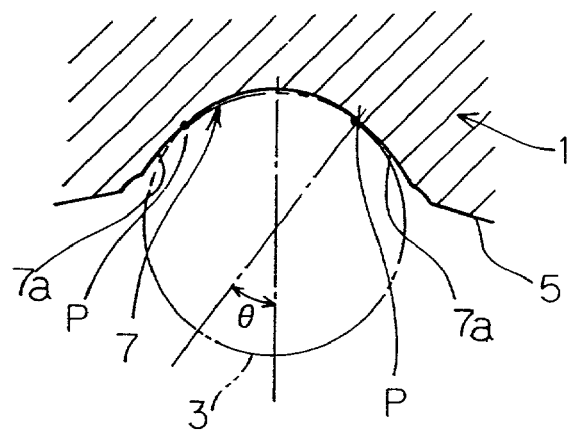
FIGS. 10A to 10C are fragmentary sectional views, on an enlarged scale, showing different shapes of a track groove defined in the outer race of the constant velocity universal joint, respectively.
Figure 10B:
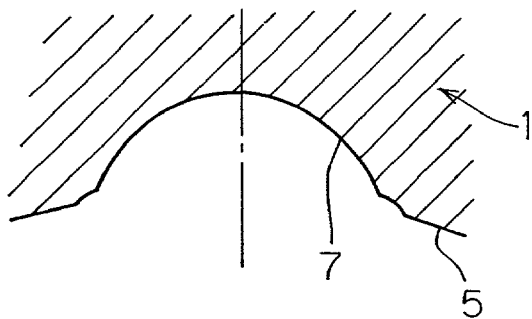
Figure 10C:
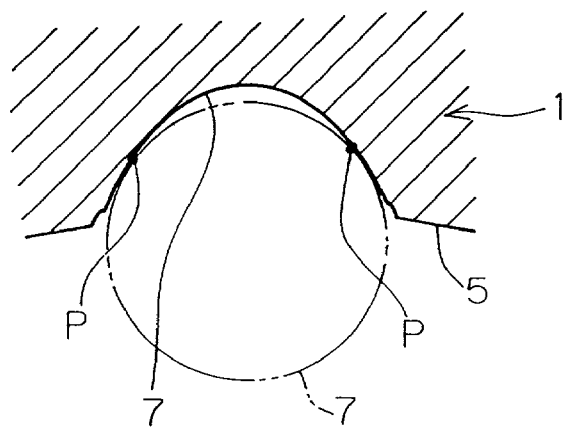

Each of the track grooves 7 in the outer race 1 has a transverse sectional shape which, as shown in FIG. 10A on an enlarged scale, depicts a shape similar to the Gothic arch and made up of opposite arcuate curves 7a and 7a confronting with each other in a direction circumferentially thereof. Where the Gothic arch is employed for the transverse sectional shape of each of the track grooves 7 in the outer race 1, the respective ball 3 contacts the associated track groove 7 at two opposite points P. For this reason, an undesirable variation of the angle θ of contact can be minimized. The angle θ of contact is defind as an angle between a radial direction of the outer race 1 and a line connecting each of the contact points P with a center of the ball 3. Other than the Gothic arch, the transverse sectional shape of each track groove 7 may be an arcuate shape as shown in FIG. 10B or an oval shape, as shown in FIG. 10C, having a major axis lying along a radial direction of the universal joint. Where the oval shape is used for the transverse sectional shape of each track groove 7, as is the case with the use of the Gothic arch therefore, the respective ball 3 can contact the associated track groove 7 at two points P.

Figure 12A:
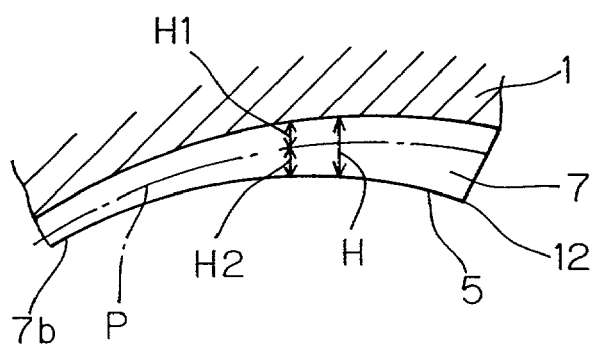
FIGS. 12A and 12B are sectional views showing different examples of a point of contact at the track groove in the outer race of the constant velocity universal joint.

As shown in FIG. 12A, each of the track grooves 7 in the outer race 1 has a groove depth H progressively increasing towards the mouth 12 of the outer race 1. The groove depth H1 from the groove bottom to each contact point P remains the same over the entire length of such track groove 7.

Figure 12B:
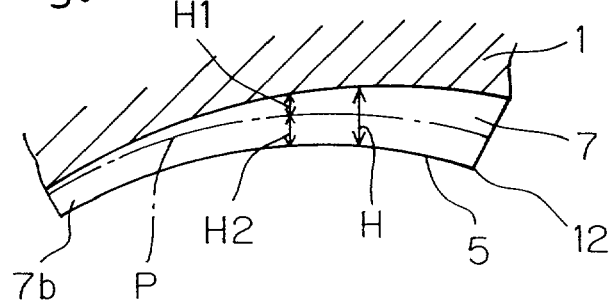

Instead of the groove depth H1 from the groove bottom to each contact point P remaining the same over the entire length of each track groove 7 as described above, the groove depth, shown by H2, from a groove opening to each contact point P may remain the same over the entire length of the associated track groove 7 as shown in FIG. 12B. In such case, the transverse sectional shape of a portion of each track groove 7 from the groove bottom to each contact point P will progressively vary.

As in the example shown in FIG. 12A, where the depth H1 from the groove bottom to each contact point P remains the same, the depth H2 from each contact point P to the groove opening would be small at one groove end portion 7b and the associated ball 3 would ride over. However, if the depth H2 from the groove opening to each contact point P is chosen to be the same as in the example shown in FIG. 12B, the problem associated with the ride-over of the associated ball 3 can advantageously be eliminated.

Figure 7:
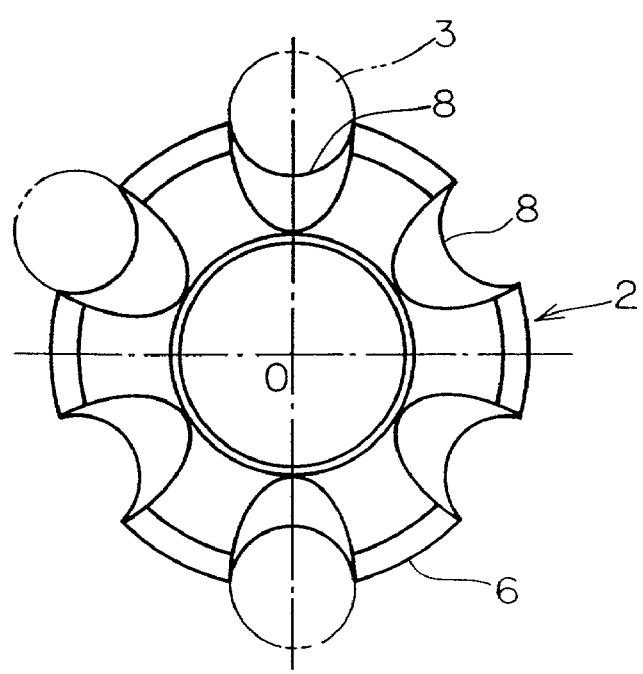
FIG. 7 is a front elevational view of the inner race shown in FIG. 6.

Referring now to FIGS. 2 and 7, each of the track grooves 8 in the inner race 2 has a transverse sectional shape which depicts a shape similar to the Gothic arch, an arcuate shape or an oval shape as is the case with that of each track groove 7 in the outer race 1. Also, each track groove 8 in the inner race 1 has a depth similarly progressively increasing towards the mouth 12 of the outer race 1.

Figure 4:
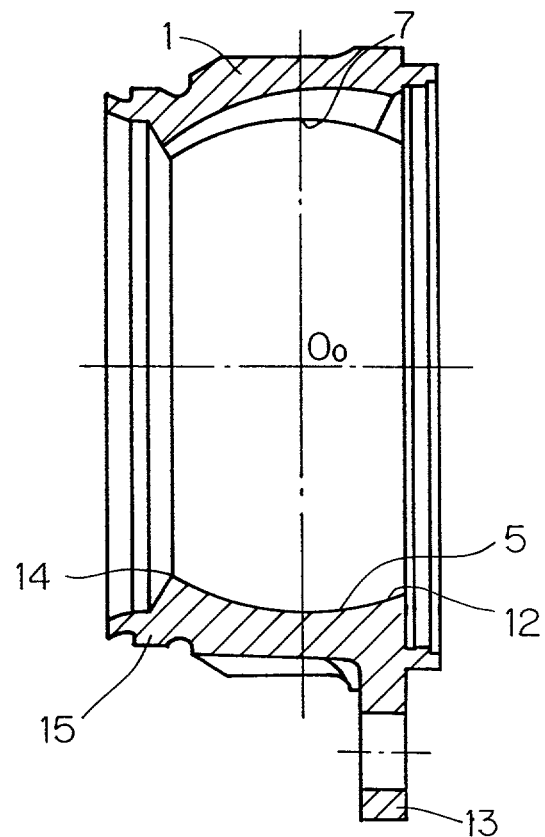
FIG. 4 is a longitudinal sectional view of an outer race used in the constant velocity universal joint shown in FIG. 1.
Figure 5:
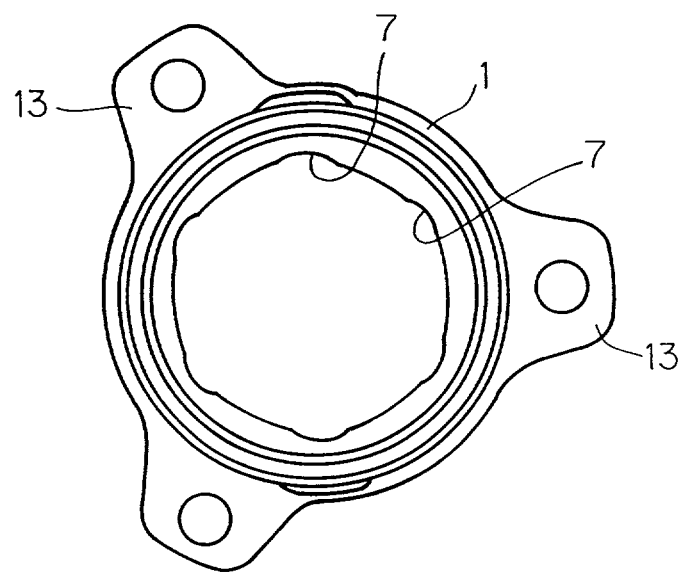
FIG. 5 is a front elevational view of the outer race shown in FIG. 4.

Referring to FIGS. 2 and 4, the spherical inner surface 5 of the outer race 1 and an inner surface of each of the track grooves 7 are, after a hardening process, rendered to be a cut surface. Where the outer race 1 is made of steel such as a medium carbon steel known as, for example, S53C according to the JIS standards, the spherical inner surface 5 of the outer race 1 and the inner surface of each of the track grooves 7 are, after the outer race 1 has been induction hardened, machined to form a cut surface. The cut surface after the induction hardening represents a surface roughness (center line average roughness) Ra which is preferably not greater than 0.8 as measured according to the method stipulated in B0601 of the JIS standards.

Figure 6:
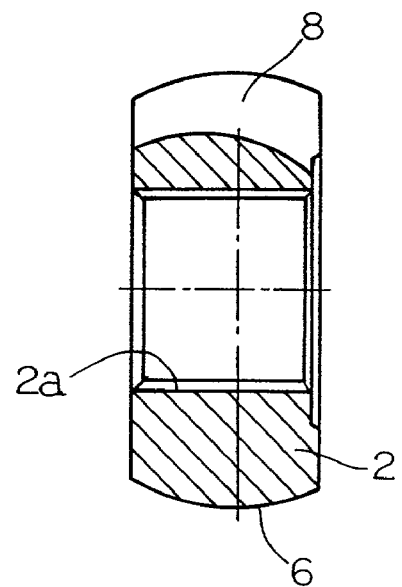
FIG. 6 is a longitudinal sectional view of an inner race used in the constant velocity universal joint shown in FIG. 1.

Referring to FIGS. 2 and 6, the spherical outer surface 6 of the inner race 2, made of a case hardening steel or the like, and the inner surface of each of the track grooves 8 are, after a carburizing process, rendered to be a post-hardened cut surface as is the case with the outer race 1.

Figure 9A:
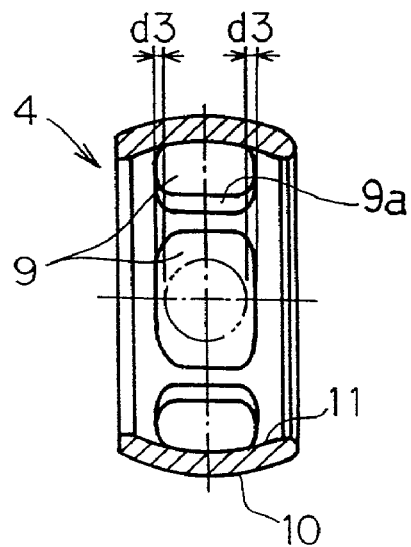
FIG. 9A is a longitudinal sectional view of a retainer or cage used in the constant velocity universal joint shown in FIG. 1.
Figure 9B:
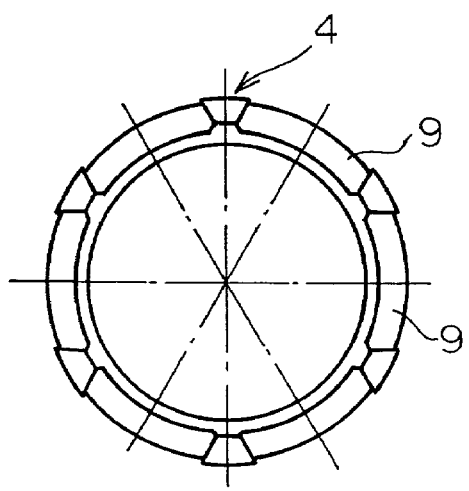
FIG. 9B is a front elevational view of the retainer shown in FIG. 9A.

In FIGS. 2 and 9, the retainer 4 made of a case hardening steel or the like has the spherical outer surface 10, the spherical inner surface 11 and an inner surface 9a of each of the pockets 9 which are, after a carburizing process, rendered to be a hardened steel cut surface.

Figure 15:
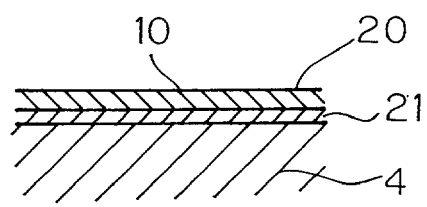
FIG. 15 is an enlarged sectional view showing a modified form of the surface treatment layer shown in FIG. 14.
Figure 16:
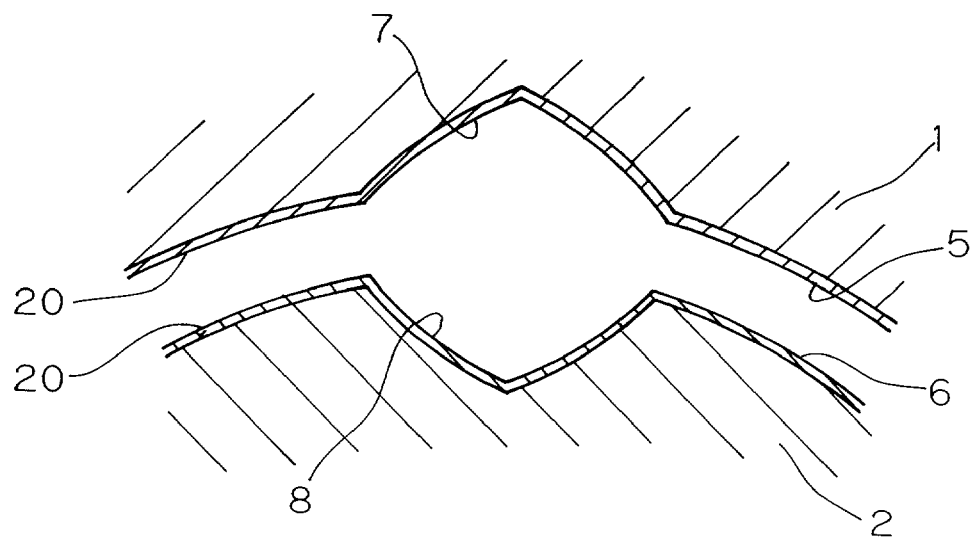
FIG. 16 is a sectional view showing the manner in which the surface treatment layer is formed on the outer race and the inner race.

The post-hardened cut surface of each of the inner race 2 and the retainer 4 has a surface roughness Ra which is preferably not greater than 0.8 as is the case with that in the outer race 1. It is to be noted that where a surface treatment layer 20 as will be described with reference to FIGS. 14 to 16 is formed on the post-hardened cut surface in each of the outer race 1, the inner race 2 and the retainer 4, the surface treatment layer 20 should have a surface roughness Ra preferably not greater than 0.8.

Figure 11:
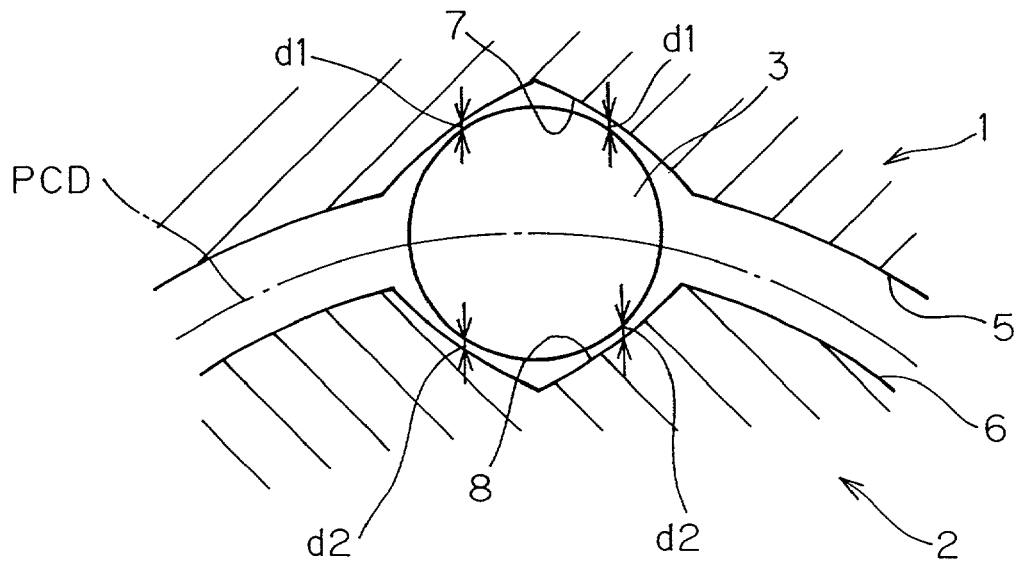
FIG. 11 is an explanatory diagram showing a relation between a ball and a radial gap defined between the ball and the track groove in the constant velocity universal joint.

As shown in FIG. 11, radial gaps between each of the track grooves 7 or 8 of any one of the outer and inner races 1 and 2 and the corresponding ball 3 as measured in a direction radially of the universal joint are indicated by d1 and d2, respectively, which represent respective radial distances between each of the balls 3, on the pitch circle PCD on which the balls 3 are designed to be positioned, and an inner surface of each track grooves 7 or 8. With the universal joint as viewed in its entirety, at the angular center $O_O$ of the universal joint (shown in FIG. 2), the quantity of play of the respective track and the corresponding ball in the radial direction can be expressed by the sum of the radial distances d1 and d2 in the track grooves at two locations opposite to each other. The sum of the radial distances d1 and d2 is preferably not greater than 0.05 mm. Where the constant velocity universal joint is intended for use with the propeller shaft, the sum of radial distances d1 and d2 is within the range of, for example, 0.005 to 0.045 mm. However, where the constant velocity universal joint is intended for use with a drive shaft, the sum of the radial distances d1 and d2 may be within the range of, for example, 0,035 to 0.125 mm.

Referring to FIG. 9A, axial gaps d3 between each of the pockets 9 in the retainer 4 and the corresponding ball 3 within such pocket 9 are each rendered to be a positive gap, that is, the ball 3 is loosely accommodated within the associated pocket 9. While in the case of the constant velocity universal joint of a fixed type for use with the drive shaft, the axial gaps between each pocket and the associated ball within such pocket are rendered to be negative (−0.01 to −0.06 mm), that is, the ball is held within the respective pocket under interference fit, the constant velocity universal joint for use with the propeller shaft such as in the illustrated embodiment is such that the pocket gaps d3 are aimed at being positive and during the assembly, they are preferably rendered to be within the range of, for example, −0.004 to +0.020 mm.

Figure 14:
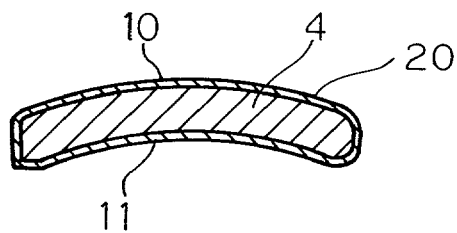
FIG. 14 is a sectional view showing the manner in which a surface treatment layer is formed in the retainer.

As shown in FIG. 14, surfaces of the retainer 4, particularly the spherical outer surface 10 and the spherical inner surface 11 thereof are preferably formed with a surface treatment layer 20 for reducing a frictional resistance. In the illustrated embodiment, the surface treatment layer 20 is formed on the entire surface of the retainer 4 including inner surfaces of the respective pocket 9 (shown in FIG. 9). The surface treatment layer 20 is in the form of a coating of a solid lubricant. Molybdenum disulfide or graphite may be used for the solid lubricant. By way of example, the molybdenum disulfide may be coated to form the surface treatment layer 20, with the use of a heat resistant resin such as, for example, polyphenylene sulfide (pps) or polyimide as a binder.

The surface treatment layer 20 made of the solid lubricant may have an undercoat 21 formed on a matrix of steel forming the retainer 4 as shown in FIG. 15. The undercoat 21 is preferably used to facilitate deposition of the solid lubricant and may be made of, for example, manganese phosphate or the like.

The surface treatment layer 20 made of the solid lubricant may have a film thickness of, for example, not greater than 12 µm. Where the undercoat 21 is employed, the film thickness including the thickness of the surface treatment layer 20 and that of the undercoat 21 is preferably not greater than 12 µm.

In FIG. 14, the surface treatment layer 20 may be a low-temperature sulfurized layer. A low-temperature sulfurizing process to form the low-temperature sulfirized layer is a process in which sulfur is immersed at a low temperature and is generally referred to as a Corbet process. Where the surface treated layer 20 is employed in the form of the low-temperature sulfurized layer, it has a film thickness preferably not smaller than 10 µm and, for example, about 30 µm.

Since the low-temperature sulfurizing process is performed at a low temperature, the matrix will not be tempered and, therefore, there is no possibility that the abrasion resistance may decrease, which would otherwise result from reduction in hardness brought about by tempering.

The surface treatment layer 20 referred to above is preferably formed not only on the entire surface of the retainer 4, but also one or more of the spherical inner surface of the outer race 1, the spherical outer surface 6 of the inner race 2, and inner surfaces of the track grooves 7 and 8 in the outer and inner races 1 and 2 as shown in FIG. 16. Even where the surface treatment layer is formed even in the outer and inner races 1 and 2, it may be made of the solid lubricant or in the form of the low-temperature sulfurized layer as is the case with those in the retainer 4 as hereinabove described and, optionally, an undercoat similar to the undercoat 21 (shown in FIG. 15) may also be employed.

It is to be noted that the surface treatment layer 20 formed in the outer and inner races 1 and 2 may be dissimilar to the surface treatment layer 20 formed in the retainer 4. By way of example, the surface treatment layer 20 formed in the outer race 1 may be made of the solid lubricant and the surface treatment layer 20 formed in the retainer 4 may then be a low-temperature sulfurized layer. Also, the surface treatment layer 20 may be formed in the outer and inner races 1 and 2 and the retainer 4 in their entirety and, alternatively, the surface treatment layer 20 may be formed only in the outer and inner races 1 and 2 while no surface treatment layer 20 is formed in the retainer 4. Again, the outer and inner races 1 and 2 may not be provided with the surface treatment layer 20 while only the retainer 4 is provided with the surface treatment layer 20. It is also possible to provide only the outer race 1 with the surface treatment layer 20 without the surface treatment layer 20 being formed in the inner race 2.

Figure 17:
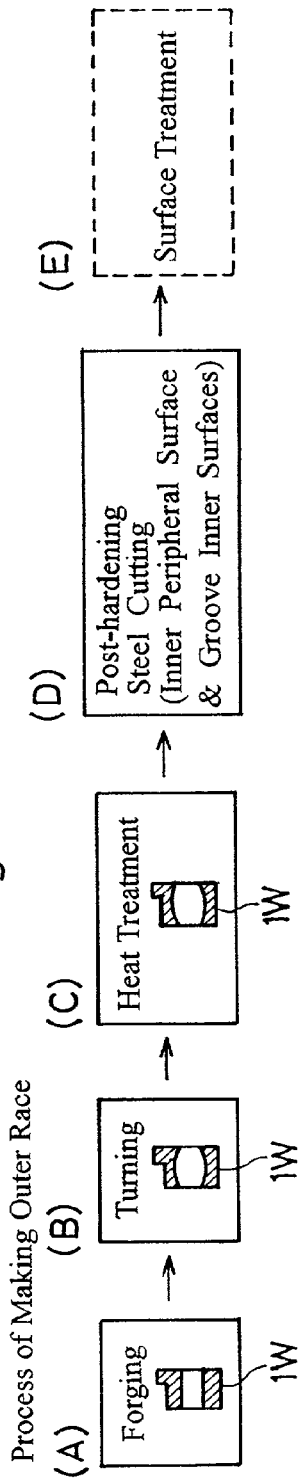
FIGS. 17 illustrates process steps of the sequence of manufacture of the outer race used in the constant velocity universal joint, respectively.

FIG. 17 illustrates the sequence of a process of manufacturing the outer race 1. An outer race member 1W, which eventually forms the outer race 1, is forged from a hollow cylinder or pipe made of steel as shown in (A) of FIG. 17. The outer race member 1W has its outer peripheral surface and others turned as shown in (B). A spherical inner surface of the outer race 1W may be surface roughened by a turning process. Thereafter, as shown in (C), the outer race member 1W which has been turned as described above is hardened, followed by post-hardening cutting of the spherical inner surface 5 (shown in FIG. 4) and the inner surfaces of the track grooves 7 after the hardening, that is, followed by a post-hardening steel cutting as shown in (D). This post-hardening steel cutting is performed by turning the spherical inner surface 5 and milling the track grooves. Tools for turning and milling that are used during the post-hardened steel cutting are employed in the form of a CBN tool. Where the surface treatment layer 20 shown in FIG. 16 is desired to be formed, it follows the post-hardened steel cutting as shown in (E), to thereby complete the outer race 1.

Figure 18:
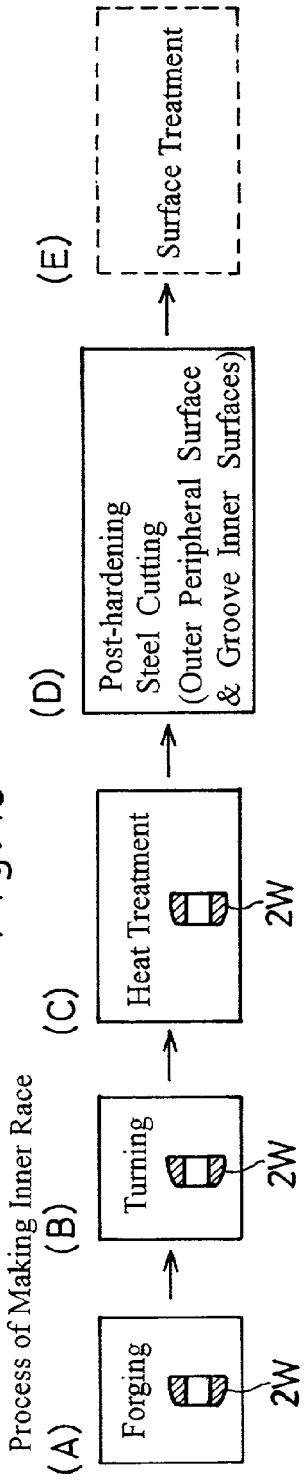
FIGS. 18 illustrates process steps of the sequence of manufacture of the inner race used in the constant velocity universal joint, respectively.

FIG. 18 illustrates the sequence of a process of manufacturing the inner race 2. As is the case with the process of making the outer race 1, forging to form an inner race member 2W, cutting of the inner race member 2W, hardening, post-hardening cutting to form the spherical outer surface 6 (shown in FIG. 6) of the inner race member 2W and the track grooves 8 and, optionally, formation of the surface treatment layer 20 are sequentially performed as shown in (A) to (E), respectively, to thereby complete the inner race 2.

Figure 19:
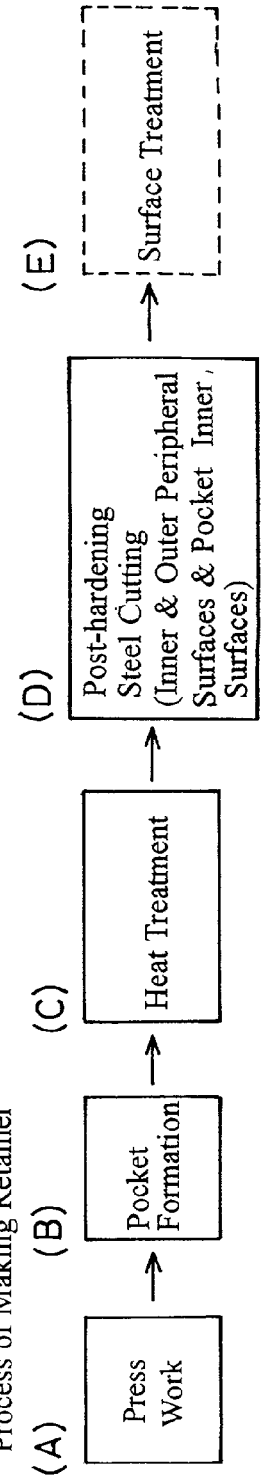
FIGS. 19 illustrates process steps of the sequence of manufacture of the retainer used in the constant velocity universal joint, respectively.

FIG. 19 illustrates the sequence of a process of making the retainer 4. This process includes a press work to form a retainer member as shown in (A) of FIG. 19, formation of the pockets 9 (shown in FIG. 9) in the retainer member as shown in (B), hardening as shown in (C), post-hardening cutting of at least inner surfaces of the pockets 9 of the spherical outer surface 10, the spherical inner surface 11 and the pockets 9 as shown in (D) and, optionally, formation of the surface treatment layer 20 as shown in (E), to thereby complete the retainer 4.

In the constant velocity universal joint of the structure hereinabove described, since the spherical inner surface 5 of the outer race 1 or the track grooves 7, or both of the spherical inner surface 5 and the track grooves 7 are finished to the post-hardening cut surfaces, the spherical outer surface 6 of the inner race 2 or the track grooves 8, or both of the spherical outer surface 6 and the track grooves 8 are finished to the post-hardened cut surfaces, and of the spherical outer surface 10, the spherical inner surface 11 and the pockets 9 at least the inner surfaces of the pockets 9 are finished to the post-hardening cut surfaces, and since in place of a grinding process after the heat treatment hitherto practiced, a cutting process after hardening is employed, the processing time can advantageously be reduced. By way of example, the required processing time may be about half that required to complete the machining. Accordingly, an effect of cost reduction can be obtained. In particular, where the number of each of the track grooves 7 and 8 is eight as shown in connection with the example of FIG. 8, since the groove forming process occupies a relatively large proportion of the entire manufacturing process, reduction of the processing time and reduction of the cost both brought about by the use of the post-hardening cutting are considerable. Since the cutting is performed after the hardening and no strain is induced during the subsequent heat treatment, the use of the post-hardening cutting ensures a dimensional precision of various parts of the constant velocity universal joint. By way of example, it is possible to secure a dimensional precision comparable to that afforded by the grinding process. Also, the use of the post-hardening cutting makes it possible to perform the process without the undesirable coolant offensive to the environment being used in contrast to the grinding process. In other words, since the cutting process is a process during which the tool is discontinuously applied to the material, a natural cooling takes place while the tool is disengaged from the material. For this reason, a dry process is possible.

Figure 13:
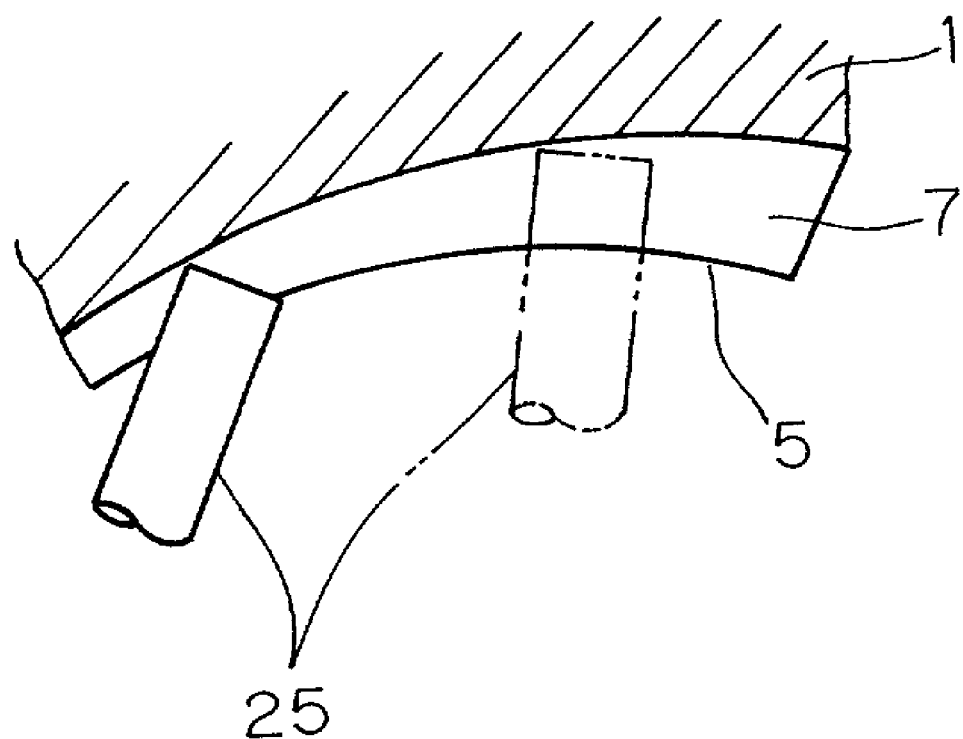
FIG. 13 is an explanatory diagram showing an example of a cutting process after the track groove in the outer race has been hardened.

Because of the hardened steel cutting, the freedom of shaping is large as compared with grinding and it is possible to render the track grooves 7 and 8 of the outer and inner races 1 and 2 to have a oval cross-sectional shape as shown in FIG. 10C. This process of forming this oval shape can be achieved by changing the angle of advance (the angle of inclination) of the tool 25 for the milling process as it proceeds in a direction longitudinally of the grooves to thereby change the width of touch of the tool 25 to the material as shown in FIG. 13. Also, by progressively changing the angle of advance of the tool 25, it is possible to progressively change the depth H1 from the groove bottom of each track groove 7 to any one of the contact points P while the depth H2 from any one of the contact points P to the groove opening is fixed, as shown in FIG. 12B.

Although with the hardened steel cutting, the resultant surface roughness would be coarse as compared with the grinding process, it can be compensated for by the use of the surface treatment layer 20 as discussed in connection with FIGS. 14 to 16. Where the surface treatment layer 20 is a film made of the solid lubricant, a lubricating effect at an initial stage of use before the lubricant is well distributed is effective to suppress heat generation. On the other hand, where the surface treatment layer 20 is the low-temperature sulfurized layer, the work will not be tempered during the treatment and, accordingly, reduction of the hardness resulting from the tempering, which would subsequently result in reduction of the abrasion resistance, can advantageously avoided.

Figure 20:
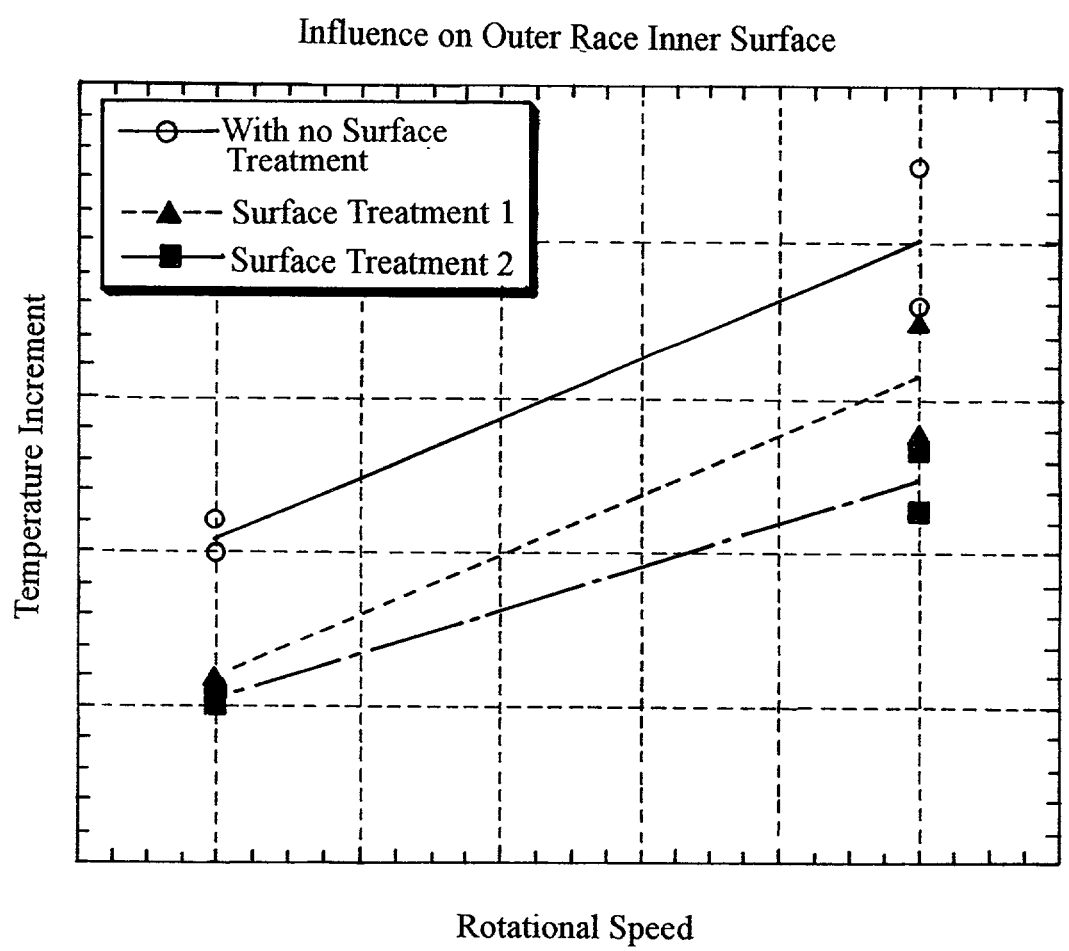
FIG. 20 is a graph illustrating how increase of the temperature is affected depending on the presence or absence of the surface treatment layer.

Hereinafter, results of some experiments will be discussed. FIG. 20 illustrates the temperature increment (the difference between a surface temperature and a room temperature) with change in specification of the outer race 1 in the constant velocity universal joint for use with the propeller shaft according to the embodiment shown in and described with reference to FIG. 2.

The specification of the outer race 1 includes the following three types of samples tested:

(1) Sample with no surface treatment effected,
(2) Sample with a surface treatment 1 (the layer of a solid lubricant used with the undercoat of manganese phosphate), and
(3) Sample with a surface treatment 2 (the low-temperature sulfuirized layer used).

The various component parts other than the outer race were of the same specification, and the retainer 4 has its entire surface formed with the low-temperature sulfurized layer and the inner race 2 was of the same specification as the surface treatment 1 employed in the outer race 1.

All of those samples were tested under the same testing condition in which a grease was used for a lubricant, 196 Nm was used with the joint angle of 10° and the number of test revolutions was 2,000 and 3,000 rpm.

From the graph shown in FIG. 20, it will be readily understood that the outer race 1 when provided with the surface treatment layer 20 is effective to suppress a temperature increase as compared with the outer race with no surface treatment layer and that where the surface treatment layer 20 is employed in the form of the low-temperature sulfurized layer, it is more effective in suppression of the temperature increase than that exhibited by the solid lubricant.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A constant velocity universal joint, comprising:
   an outer race having a spherical inner surface, said spherical inner surface having a plurality of track grooves defined therein, each of said track grooves in the outer race having a groove bottom of a longitudinal sectional shape representing a shape of a curve;
   an inner race having a spherical outer surface and positioned inside the outer race, said spherical outer surface having a plurality of track grooves defined therein in correspondence with the respective track grooves in the outer race, each of said track grooves in the inner race having a groove bottom of a longitudinal sectional shape representing a shape of a curve;

a plurality of balls interposed between the outer and inner races and rotatably accommodated between the mating track grooves in the outer and inner races;

a retainer having a plurality of pockets accommodating therein the corresponding balls, said retainer having a spherical outer surface, held in surface contact with the spherical inner surface of the outer race, and a spherical inner surface held in surface contact with the spherical outer surface of the inner race;

each of said track grooves in the outer race having a center of curvature lying in an axial section of the outer race; and each of said track grooves in the inner race having a center of curvature lying on an axial section of the inner race, said center of curvature of each track groove in the outer race and said center of curvature of each track groove in the inner race being offset an equal distance leftwardly and rightwardly with respect to an angle center of the universal joint;

at least one of said spherical inner surface of the outer race or each of the track grooves in the outer race being defined by a post-hardening cut surface, a surface of at least the retainer being formed with a surface treatment layer to reduce a frictional resistance, and a surface treatment layer formed in the inner and outer races is different than the surface treatment layer formed in the surface of the retainer.

2. A constant velocity universal joint, comprising:

an outer race having a substantially spherical inner surface, said substantially spherical inner surface having a plurality of track grooves defined therein, each of said track grooves in the outer race having a groove bottom of a longitudinal sectional shape representing a shape of a curve;

an inner race having a substantially spherical outer surface and positioned inside the outer race, said substantially spherical outer surface having a plurality of track grooves defined therein in correspondence with the respective track grooves in the outer race, each of said track grooves in the inner race having a groove bottom of a longitudinal sectional shape representing a shape of a curve;

a plurality of balls interposed between the outer and inner races and rotatably accommodated between the mating track grooves in the outer and inner races;

a retainer having a plurality of pockets accommodating therein the corresponding balls, said retainer having a substantially spherical outer surface, held in surface contact with the substantially spherical inner surface of the outer race, and a substantially spherical inner surface held in surface contact with the substantially spherical outer surface of the inner race;

each of said track grooves in the outer race having a center of curvature lying in an axial section of the outer race;

each of said track grooves in the inner race having a center of curvature lying on an axial section of the inner race, said center of curvature of each track groove in the outer race and said center of curvature of each track groove in the inner race being offset an equal distance leftwardly and rightwardly with respect to an angle center of the universal joint; and at least one of said substantially spherical inner surface of the outer race and each of the track grooves in the outer race being defined by a post-hardening cut surface, wherein of the substantially spherical outer surface, the substantially spherical inner surface, and the pockets, at least the pockets have respective inner surfaces which are defined by a post-hardening cut surface, a surface of at least the retainer is formed with a surface treatment layer for reducing a frictional resistance, the surface treatment layer is a film of a solid lubricant, and an undercoat is provided between the surface of the retainer and the solid lubricant.

3. A constant velocity universal joint, comprising:

an outer race having a substantially spherical inner surface, said substantially spherical inner surface having a plurality of track grooves defined therein, each of said track grooves in the outer race having a groove bottom of a longitudinal sectional shape representing a shape of a curve;

an inner race having a substantially spherical outer surface and positioned inside the outer race, said substantially spherical outer surface having a plurality of track grooves defined therein in correspondence with the respective track grooves in the outer race, each of said track grooves in the inner race having a groove bottom of a longitudinal sectional shape representing a shape of a curve;

a plurality of balls interposed between the outer and inner races and rotatably accommodated between the mating track grooves in the outer and inner races;

a retainer having a plurality of pockets accommodating therein the corresponding balls, said retainer having a substantially spherical outer surface, held in surface contact with the substantially spherical inner surface of the outer race, and a substantially spherical inner surface held in surface contact with the substantially spherical outer surface of the inner race;

each of said track grooves in the outer race having a center of curvature lying in an axial section of the outer race;

each of said track grooves in the inner race having a center of curvature lying on an axial section of the inner race, said center of curvature of each track groove in the outer race and said center of curvature of each track groove in the inner race being offset an equal distance leftwardly and rightwardly with respect to an angle center of the universal joint; and at least one of said substantially spherical inner surface of the outer race and each of the track grooves in the outer race being defined by a post-hardening cut surface, wherein of the substantially spherical outer surface, the substantially spherical inner surface, and the pockets, at least the pockets have respective inner surfaces which are defined by a post-hardening cut surface, a surface of at least the retainer is formed with a surface treatment layer for reducing a frictional resistance, and a surface treatment layer formed on the inner and outer races is different than the surface treatment layer formed on the surface of the retainer.

4. A constant velocity universal joint, comprising:

an outer race having a substantially spherical inner surface, said substantially spherical inner surface having a plurality of track grooves defined therein, each of said track grooves in the outer race having a groove bottom of a longitudinal sectional shape representing a shape of a curve;

an inner race having a substantially spherical outer surface and positioned inside the outer race, said substantially spherical outer surface having a plurality of track grooves defined therein in correspondence with the respective track grooves in the outer race, each of said track grooves in the inner race having a groove bottom of a longitudinal sectional shape representing a shape of a curve;

a plurality of balls interposed between the outer and inner races and rotatably accommodated between the mating track grooves in the outer and inner races;

a retainer having a plurality of pockets accommodating therein the corresponding balls, said retainer having a substantially spherical outer surface, held in surface contact with the substantially spherical inner surface of the outer race, and a substantially spherical inner surface held in surface contact with the substantially spherical outer surface of the inner race;

each of said track grooves in the outer race having a center of curvature lying in an axial section of the outer race;

each of said track grooves in the inner race having a center of curvature lying on an axial section of the inner race, said center of curvature of each track groove in the outer race and said center of curvature of each track groove in the inner race being offset an equal distance leftwardly and rightwardly with respect to an angle center of the universal joint; and at least one of said substantially spherical inner surface of the outer race and each of the track grooves in the outer race being defined by a post-hardening cut surface, wherein the constant velocity universal joint is for use with a propeller shaft, the outer race has an inlet mouth and a rear opening opposite the inlet mouth and having a diameter smaller than a diameter of the inlet mouth,said outer race also having a fitting flange formed therewith at a location radially outwardly of an outer periphery of the inlet mouth and a cylinder mount formed therewith to protrude axially outwardly from the opening, wherein the propeller shaft extends through the rear opening and is then engaged with the inner peripheral surface of the inner race, a surface of at least the retainer is formed with a surface treatment layer to reduce a frictional resistance, the surface treatment layer is a film of a solid lubricant, and an undercoat is provided between the surface of the retainer and the solid lubricant.

5. A constant velocity universal joint, comprising:

an outer race having a substantially spherical inner surface, said substantially spherical inner surface having a plurality of track grooves defined therein, each of said track grooves in the outer race having a groove bottom of a longitudinal sectional shape representing a shape of a curve;

an inner race having a substantially spherical outer surface and positioned inside the outer race, said substantially spherical outer surface having a plurality of track grooves defined therein in correspondence with the respective track grooves in the outer race, each of said track grooves in the inner race having a groove bottom of a longitudinal sectional shape representing a shape of a curve;

a plurality of balls interposed between the outer and inner races and rotatably accommodated between the mating track grooves in the outer and inner races;

a retainer having a plurality of pockets accommodating therein the corresponding balls, said retainer having a substantially spherical outer surface, held in surface contact with the substantially spherical inner surface of the outer race, and a substantially spherical inner surface held in surface contact with the substantially spherical outer surface of the inner race;

each of said track grooves in the outer race having a center of curvature lying in an axial section of the outer race;

each of said track grooves in the inner race having a center of curvature lying on an axial section of the inner race, said center of curvature of each track groove in the outer race and said center of curvature of each track groove in the inner race being offset an equal distance leftwardly and rightwardly with respect to an angle center of the universal joint; and at least one of said substantially spherical inner surface of the outer race and each of the track grooves in the outer race being defined by a post-hardening cut surface, wherein the constant velocity universal joint is for use with a propeller shaft, the outer race has an inlet mouth and a rear opening opposite the inlet mouth and having a diameter smaller than a diameter of the inlet mouth,said outer race also having a fitting flange formed therewith at a location radially outwardly of an outer periphery of the inlet mouth and a cylinder mount formed therewith to protrude axially outwardly from the opening, wherein the propeller shaft extends through the rear opening and is then engaged with the inner peripheral surface of the inner race, a surface of at least the retainer is formed with a surface treatment layer to reduce a frictional resistance, a surface treatment layer formed on the inner and outer races is different than the surface treatment layer formed on the surface of the retainer.

* * * * *

UNITED STATES PATENT AND TRADEMARK OFFICE
CERTIFICATE OF CORRECTION

| | |
|---|---|
| PATENT NO. | : 7,094,155 B2 |
| APPLICATION NO. | : 09/995678 |
| DATED | : August 22, 2006 |
| INVENTOR(S) | : Takashi Hosoya et al. |

It is certified that error appears in the above-identified patent and that said Letters Patent is hereby corrected as shown below:

In the claims:

Claim 3, col. 14, line 57 change "resistance,and" to --resistance, and--

Claim 4, col. 15, line 34, change "opposite the" to --opposite to the--

Claim 4, col. 15, line 35, change "mouth,said" to --mouth, said--

Claim 4, col. 15, line 38, change "cylinder" to --cylindrical--

Claim 5, col. 16, line 37, change "opposite the" to --opposite to the--

Claim 5, col. 16, line 38, change "mouth,said" to --mouth, said--

Claim 5, col. 16, line 41, change "cylinder" to --cylindrical--

Claim 5, col. 16, line 47, after "resistance," insert --and--

Signed and Sealed this

First Day of May, 2007

JON W. DUDAS
*Director of the United States Patent and Trademark Office*